(12) United States Patent
Reime

(10) Patent No.: US 10,712,468 B2
(45) Date of Patent: Jul. 14, 2020

(54) DEVICE AND METHOD FOR DETECTING AN ARTICLE

(71) Applicant: ZIRCON CORPORATION, Campbell, CA (US)

(72) Inventor: Gerd Reime, Bühl (DE)

(73) Assignee: ZIRCON CORPORATION, Campbell, CA (US)

( * ) Notice: Subject to any disclaimer, the term of this patent is extended or adjusted under 35 U.S.C. 154(b) by 0 days.

(21) Appl. No.: 15/738,690

(22) PCT Filed: Jun. 17, 2016

(86) PCT No.: PCT/EP2016/064013
§ 371 (c)(1),
(2) Date: Dec. 21, 2017

(87) PCT Pub. No.: WO2016/207073
PCT Pub. Date: Dec. 29, 2016

(65) Prior Publication Data
US 2018/0180757 A1    Jun. 28, 2018

(30) Foreign Application Priority Data
Jun. 23, 2015 (DE) .......... 10 2015 211 551

(51) Int. Cl.
*G01V 3/10* (2006.01)
(52) U.S. Cl.
CPC .............. *G01V 3/102* (2013.01); *G01V 3/108* (2013.01)
(58) Field of Classification Search
None
See application file for complete search history.

(56) References Cited

U.S. PATENT DOCUMENTS 4,628,265 A * 12/1986 Johnson ................. G01V 3/107
324/225
5,729,143 A    3/1998 Tavernetti
(Continued)

FOREIGN PATENT DOCUMENTS

DE        3733529 A1    4/1989
DE       10131243 C1   11/2002
(Continued)

OTHER PUBLICATIONS

International Search Report for corresponding application PCT/EP2016/064013 filed Jun. 17, 2016; dated Oct. 7, 2016.

*Primary Examiner* — Jermele M Hollington
*Assistant Examiner* — Suresh K Rajaputra
(74) *Attorney, Agent, or Firm* — Cantor Colburn LLP

(57) ABSTRACT

The invention relates to a device having, as a sensor for detecting an object arranged behind an article that is transparent to electromagnetic radiation, a coil assembly having a first transmitting coil (1.1) and a first receiving coil (2.1) arranged orthogonally with respect to the first transmitting. An evaluation unit evaluates the output signals from the coil assembly. The fact that the coil assembly comprises the first transmitting coil (1.1) and at least one further transmitting coil (1.2, 1.3, 1.4), and the first receiving coil (2.1) and at least one further receiving coil (2.2, 2.3, 2.4), wherein axes (1.5, 1.6) of the first and of the at least one further transmitting coil are orthogonal to each other, and the axes (1.5, 1.6) of the first and second transmitting coil intersect the axis (2.5) of the first receiving coil (2.1) that is orthogonal to the first and second transmitting coils (1.1, 1.2), means that a device is provided that reduces or even eliminates the grating effect. According to the method, for this purpose, the electromagnetic fields emitted by the transmitting coils as a result of a periodic AC signal during a first half period are each directed in the direction of the first receiving coil (2.1)

(Continued)

and, during the second half period, are directed away from the first receiving call (2.1), wherein the first receiving coil (2.1) is wired and operated in series with at least one further receiving coil (2.2, 2.3, 2.4). An electromagnetic field which penetrates the coil assembly, generates mutually opposed voltages in the receiving coils (2.1, 2.3; 2.2, 2.4).

11 Claims, 5 Drawing Sheets

(56) References Cited

U.S. PATENT DOCUMENTS

| | | |
|---|---|---|
| 6,541,965 B1 | 4/2003 | Binder |
| 8,450,997 B2 * | 5/2013 | Silverman ............... G01B 7/004 |
| | | 324/207.15 |
| 2009/0219027 A1 * | 9/2009 | Morrison ............... G01V 3/104 |
| | | 324/326 |
| 2010/0219823 A1 * | 9/2010 | Gogolla ................. G01V 3/10 |
| | | 324/258 |
| 2015/0002166 A1 | 1/2015 | Krupezevic |
| 2015/0153474 A1 | 6/2015 | Donderici |

FOREIGN PATENT DOCUMENTS

| | | |
|---|---|---|
| DE | 202004011921 U1 | 11/2004 |
| DE | 10324579 A1 | 12/2004 |
| DE | 102009010943 A1 | 9/2010 |
| DE | 102010007620 A1 | 9/2010 |
| EP | 1092988 A1 | 4/2001 |
| EP | 0657032 B1 | 10/2005 |
| EP | 1740981 B1 | 2/2009 |

* cited by examiner

DEVICE AND METHOD FOR DETECTING AN ARTICLE

CROSS REFERENCE TO RELATED APPLICATIONS

The present application refers to and claims the priority of the German patent application 10 2015 211 551.8, filed on 23 Jun. 2015, the entire content of which is hereby incorporated by reference.

FIELD OF THE INVENTION

The invention relates to a device and a method for detecting an object arranged behind an article that is transparent to an electromagnetic radiation.

BACKGROUND

In general, inductive sensors for finding a metallic, electrically conductive object in a surrounding medium are known, for example, from U.S. Pat. No. 5,729,143.

Sensors which detect the presence or movement of a non-metallic object through a flat or planar article, for example, through a panel that is not transparent to optical radiation are usually constructed on the principle of capacitance measurement. For example, capacitive touch pads are a known application as known e.g. from DE 103 24 579 A1, or capacitive proximity sensors as described, for example, in DE 101 31 243 C1 in which a sensor with sensor electrodes and an associated control circuit for evaluating the sensor signals are provided, wherein a further electrode surrounds the sensor electrode. In these applications, the sensor unit is firmly connected to the panel to be penetrated and, as viewed from the sensor unit, the object to be detected moves behind this panel. Due to the mechanical arrangement, the sensor and the panel have a fixed capacitance relative to one another which is reflected in the measurement value as a constant basic capacitance.

In a further application there are sensors which must be moved over the planar article or the panel in order to locate objects lying therebehind, as is known e.g. from EP 0 657 032 B1 and EP 1 740 981 B1. This includes so-called stud-detectors. Stud-detectors are general ancillary devices for DIY practitioners and professionals, for example, for detecting studs, posts, pipes or power lines behind a closed wood cladding or a covering in ready-built houses. For this purpose, the sensor is guided over the wall. It measures with an electrode the capacitance relative to the wall. If a wooden post, a pipe or a power line is situated in the detection range, due to the change in the dielectric material, the capacitance increases. This is suitably evaluated and displayed to the user. Provided the sensor is moved at exactly the same spacing from the flat article or panel, the capacitance between the sensor and the flat article or panel does not change. It enters the measurement signal only as a constant value, as in the first two examples. However, with the example of the stud-detector, it can be understood that the maintenance of a constant spacing is almost impossible in practice and therefore the basic capacitance resulting from the wall construction changes significantly as a function of the spacing. Therefore, in the following description of the invention, the stud-detector is also selected as an exemplary embodiment.

From DE 20 2004 011 921 U1, a coil arrangement is known, in particular for a metal detector, consisting of a transmitting coil and a receiving coil arranged orthogonally to the transmitting coil. The distinctive feature of this orthogonal arrangement lies therein that the two coils can be positioned relative to one another so that without external influences on the receiving coil, no voltage induced by the transmitting coil operated with an electronic signal can be measured. A metallic, electrically conductive object in the detection range of the sensor bends the field lines of the emitted electromagnetic field permeating the receiving coil, so that an induced voltage can be measured on the receiving coil. This voltage is referred to below as the measurement signal.

If, for example, a steel reinforcement in concrete would have been detected with such an inductive sensor, the sensor is guided along the concrete surface. A maximum measurement signal occurs when the reinforcing steel has a minimum spacing from the sensor arrangement. Accordingly, the presence of a reinforcing steel is interpreted at the local positions where maxima of the measurement signal occur.

If, for example, a steel reinforcing grid cast in concrete is measured in this way with an inductive sensor, then eddy currents which occur in a metallic, electrically conductive object due to the emitted electromagnetic field of the inductive sensor can impair the measurement such that, for example, a minimum of the measurement signal occurs over a steel reinforcing segment of the grid and a maximum of the measurement signal occurs over the hollow sites in the middle of the grid. Circulating currents along the grid structure which act like electrical loops are responsible for this effect.

False interpretations can thus arise since the spatial position of a reinforcing steel segment is interpreted at the site where a maximum measurement signal occurs. The unwanted occurrence of measurement signal maxima or measurement signal minima at unfavourable sites of a grid-like metallic, electrically conductive object which can lead to false interpretations is referred to below as the grid effect.

DE 37 33 529 A1 discloses an inductive metal detecting device with at least four exciter coils and at least one receiving coil. The four exciter coils the centre points of which are arranged on a closed circular path are controlled in a periodic sequence with different currents such that a resultant magnetic field largely continuously changes its direction at an amplitude that remains substantially constant at a repetition frequency corresponding to said sequence. The exciter coils are arranged either in a plane spanned by the circular path or are each orthogonal to the plane.

US 2009/0219027 A1 discloses a multisensor for detecting and identifying unexploded ordnance. The multisensor has at least two transmitting coils arranged orthogonally to one another and a plurality of receiving coils arranged orthogonally thereto. The receiving coils are arranged in two planes spaced from one another and extending orthogonally to the transmitting coils, wherein the transmitting coils are arranged between the receiving coils.

From DE 10 2010 007 620 A1, there is known a proximity sensor with a first transmitting coil, a second transmitting coil, at least one receiving coil, an exciter device which is connected to the first and second transmitting coil, and an evaluation device which is connected to at least one transmitting coil and/or the exciter device and to the at least one receiving coil.

EP 1 092 988 A1 discloses an inductive sensor arrangement for detecting metallic objects hidden by a surrounding medium. The sensor arrangement has two transmitting coils arranged adjacently to one another at a defined spacing and in one plane, and a pair of receiving coils, each receiving coil being arranged in a respective field of the transmitting coils such that, in a setting that is free from iron-containing objects, no voltage is induced in them.

DE 10 2009 010 943 A1 relates to an operating method and a coil arrangement for a magnetic sensor for detecting metallic objects in a subsurface medium with a first main coil, at least two coils of a first coil group arranged in an interior space of an expanded winding cylinder of the first main coil and at least two coils of a second coil group arranged in the interior space of the expanded winding cylinder of the first main coil, and having a different orientation from the coils of the first coil group.

BRIEF SUMMARY

Proceeding from this prior art, it is an object of the present invention to provide a device and a method which lessen or even eliminate the grid effect.

In order to solve the problem, the transmitting coils and the receiving coils are arranged orthogonally to one another and operated alternatingly in different configurations so that by offsetting the amplitude responses, it can be determined whether a grid segment or a hollow space within the grid structure is present under the coil arrangement. By means of the special arrangement and special wiring of the transmitting and receiving coils, advantages are achieved for the precise position determination of metallic, electrically conductive objects. In particular, advantages are achieved in the precise position determination of metallic, electrically conductive grid-like structures and/or electrically contacted loops in which with known inductive sensors, the grid effect can occur. The coil arrangement described here prevents the occurrence of the grid effect so that both the position of individual metallic, electrically conductive objects and also of grid-like constructions consisting of metallic, electrically conductive segments can be precisely determined.

Preferably, through the use of two configurations of the coils arranged opposing one another, which are present in the coil arrangement comprising a plurality of transmitting and receiving coils, and adding the signal amplitudes determined in the respective configurations, a symmetrical measurement signal can be determined along a movement path of the sensor. If, advantageously, further configurations are used which are arranged transversely to the first two configurations, an evaluation can also take place transversely to the movement path, and thus two-dimensionally. By means of time multiplexing of a plurality of configurations, a plurality of measurement signals can be recorded and processed with only one evaluating unit.

BRIEF DESCRIPTION OF THE DRAWINGS

The invention will now be described in greater detail making reference to exemplary embodiments illustrated in the accompanying Figures. In the drawings.

DETAILED DESCRIPTION OF PREFERRED EMBODIMENTS

Figure 1:
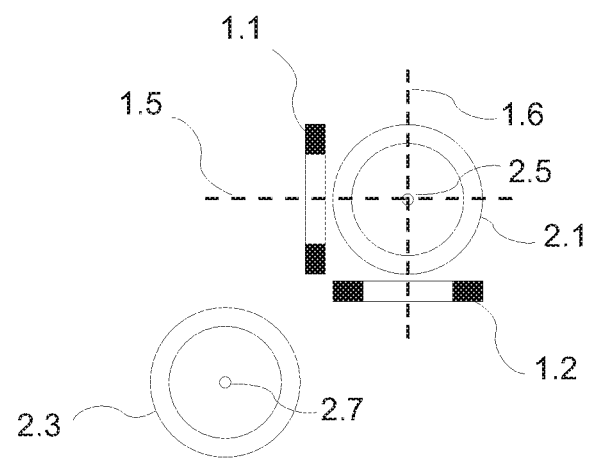
FIG. 1 shows a plan view of a simple geometrical coil arrangement.

The invention will now be described in greater detail making reference to the accompanying drawings. However, the exemplary embodiments concern only examples which are not intended to restrict the inventive concept to a particular arrangement. Before the invention is described in detail, it should be noted that the invention is not restricted to the various components of the device and the various method steps, since these components and method can vary. The expressions used here are intended merely to describe particular embodiments and are not used restrictively. If, furthermore, the singular or the indefinite article are used in the description or the claims, this also relates to a plurality of these elements, provided the overall context does not clearly reveal otherwise.

The drawings show a device for detecting an object arranged behind a preferably planar or flat article 12 that is transparent to an electromagnetic radiation, said object being in the exemplary embodiment a grid segment 9.1 of a reinforcing grid in a wall. However, the device is also suitable fundamentally for detecting changes due to an object which influences the electromagnetic field that is generated by transmitting coils by means of the alternating voltage transmitting signal 5.1. Such objects can be hidden behind any articles or materials in a floor, a ceiling or a wall.

For this purpose, the device has a coil arrangement consisting of at least a first transmitting coil 1.1 and a second transmitting coil 1.2 arranged orthogonally to the first transmitting coil, as well as at least a first receiving coil 2.1 arranged orthogonally to the first and second transmitting coil and a second receiving coil 2.3 arranged orthogonally to the first and second transmitting coil. The coil arrangement thus forms a sensor for detecting the object on a relative movement between the device and a flat article 12. By means of a control circuit, the at least one transmitting coil 1.1, 1.2 is driven or controlled and the output signals of the sensor are evaluated.

The coils described in this application can be any desired coils, in particular coils printed onto a conducting track. A spatial position of the coils relative to one another is described in the following by means of imaginary coil planes and/or by means of imaginary axes of the coils. The geometric details serve only to illustrate the arrangement and do not need to be mathematically exactly configured. Rather, these can have a certain degree of imprecision, provided the effect and the measurement accuracy described is achievable. In particular, if these are attributable to tolerances and/or are easily compensatable by the circuit illustrated in FIG. 6 in the sense, in particular, of a calibration and/or an adjustment of the arrangement, in particular, in the sense of a virtual spatial adjustment and/or orientation of the coils and/or their fields achieved by electronic means.

A coil plane can be understood as an imaginary plane which lies orthogonally to a central flux occurring in an eye and in an energised state of the coil, wherein the central flux extends, in particular, through a centre point of the eye.

An axis of the coil can be understood as a straight line extending through the eye, through the central flux and in the direction of the central flux. The imaginary axis therefore lies orthogonally to the respective imaginary coil plane. In particular, a direction of a field generated by a coil can be understood as the direction of the central flux occurring in the eye. Depending on the energization, therefore, two directions mutually opposed by 180° along the imaginary axis are conceivable.

In the case of a coil with a round winding, the imaginary axis and the imaginary coil plane extend through a centre point of a circle or circular cylinder bordered by the winding and representing the eye of the coil.

In the case of a printed-on coil, the coil plane can be understood as being a plane spanned by a surface onto which the coil is printed, wherein the eye of such a coil can be assumed to be two-dimensional and also lies on the surface.

The eye of the coil can be understood, with a flat coil, as being an area enclosed by the winding or, with a spatially expanded coil, a body enclosed by the winding.

Figure 2:
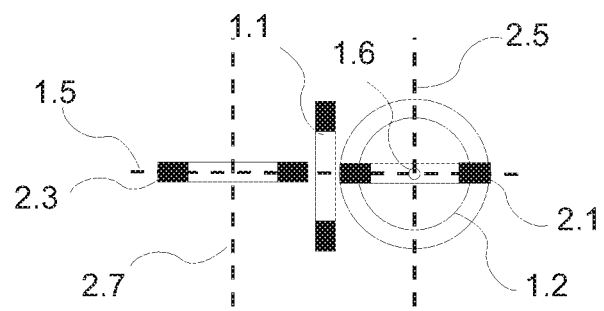
FIG. 2 shows a lateral phantom view through the coil arrangement of FIG. 1.

According to FIGS. 1, 2, the axes 1.5, 1.6 of the first and second transmitting coils 1.1, 1.2 lie orthogonally to one another and ideally intersect the axis 2.5 of the first receiving coil 2.1 at one point, in particular, orthogonally. The axes 1.5, 1.6 of the transmitting coils therefore lie in the plane in which the receiving coils 2.1, 2.2, 2.3, 2.4 are arranged. The spacing between the second transmitting coil 1.2 and the first receiving coil 2.1 is the same size as the spacing between the first transmitting coil 1.1 and the first receiving coil 2.1. These spacings are selected as small as possible.

In an exemplary embodiment not shown in FIGS. 1 and 2, the axes 1.5, 1.6 of the first and second transmitting coils 1.1, 1.2 are arranged orthogonally skewed to one another and intersect the axis 2.5 of the first receiving coil 2.1 at two points, in particular, each orthogonally.

Figure 3:
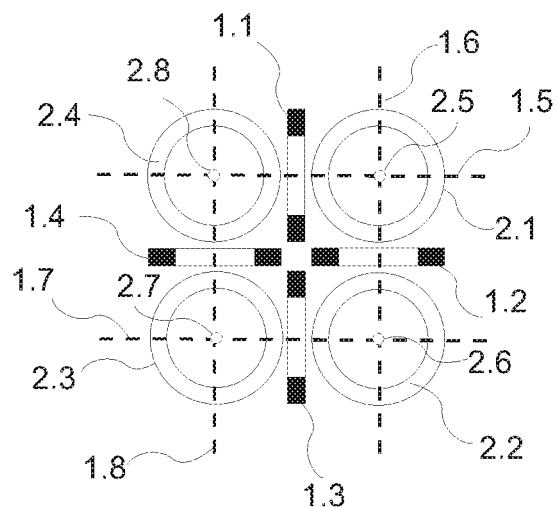
FIG. 3 shows a plan view of a coil arrangement duplicated in relation to FIG. 1 for two-dimensional movement paths.
Figure 4:
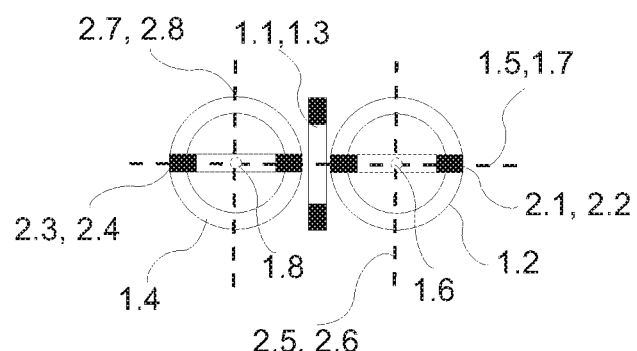
FIG. 4 shows a lateral phantom view through the duplicated coil arrangement of FIG. 3.

If further transmitting coils are provided as a third transmitting coil 1.3 and a fourth transmitting coil 1.4, in accordance with FIGS. 3, 4, the axes 1.5, 1.7 of the first transmitting coil 1.1 and the third transmitting coil 1.3 and the axes 1.6, 1.8 of the second transmitting coil 1.2 and the fourth transmitting coil 1.4 extend parallel to one another in each case. The axes 1.5, 1.6, 1.7, 1.8 of adjacent transmitting coils 1.1, 1.2, 1.3, 1.4 in the plan view of FIG. 3 are arranged orthogonally to one another and intersect ideally at one point the axes 2.5, 2.6, 2.7, 2.8 of the receiving coils 2.1, 2.2, 2.3, 2.4, said receiving coils each being arranged between two of the transmitting coils 1.1, 1.2, 1.3, 1.4, said axes 2.5, 2.6, 2.7, 2.8 being orthogonal to the axes 1.5, 1.6, 1.7, 1.8 of the transmitting coils 1.1, 1.2, 1.3, 1.4, in particular at two points if the axes 1.5, 1.6, 1.7, 1.8 of the respective transmitting coils 1.1, 1.2, 1.3, 1.4 are arranged orthogonally skewed to one another. Thus, for example, the first transmitting coil 1.1, and the fourth transmitting coil 1.4 are adjacent to one another and enclose between them the fourth receiving coil 2.4. Thus the first transmitting coil 1.1 and the fourth transmitting coil 1.4 and their axes 1.5 and 1.8, respectively, are arranged orthogonally to one another and intersect ideally at one point the axis 2.8 of the receiving coil 2.4, said receiving coil being arranged between these transmitting coils 1.1 and 1.4, said axis 2.8 being orthogonal to the axes 1.5, 1.6, 1.7, 1.8 of the transmitting coils 1.1, 1.2, 1.3, 1.4.

Here also, therefore, the axes 1.5, 1.6, 1.7, 1.8 of the transmitting coils 1.1, 1.2, 1.3, 1.4 lie in the plane in which the receiving coils 2.1, 2.2, 2.3, 2.4 are arranged. However, the spacings, in particular within the configurations of the coil arrangement described below, between the cooperating transmitting coils and the associated receiving coils are equal-sized and are also selected as small as possible.

In an imaginary Cartesian coordinate system of the coil arrangement of FIG. 3, the origin of which lies in the middle between the receiving coils 2.1, 2.3 and the Z-axis of which points in the direction of the object to be detected, the receiving coils 2.1, 2.2, 2.3, 2.4 are arranged in the XY plane. If the first transmitting coil 1.1 lies, for example, in the XZ plane, then the second transmitting coil 1.2 lies in the YZ plane. The origin of this Cartesian coordinate system can be understood as being the centre point of the coil arrangement or can define said centre point.

During operation of the coil arrangement, the grid structure to be detected preferably lies parallel to the XY plane of the imaginary coordinate system and to the plane spanned by the receiving coils 2.1, 2.2, 2.3, 2.4. For detection, the receiving coils 2.1, 2.2, 2.3, 2.4 of the coil arrangement can be positioned parallel to the grid structure and accordingly displaced parallel thereto, By this means, all the receiving coils 2.1, 2.2, 2.3, 2.4 and also all the transmitting coils 1.1, 1.2, 1.3, 1.4, the axes 1.5, 1.6, 1.7, 1.8 of which lie, in particular, in the XY plane, and the plane of the receiving coils 2.1, 2.2, 2.3, 2.4 are inductively coupled equally strongly to the target, that is, the grid structure.

The conceptuality, the spatial arrangement and the electronic significance associated therewith of transmitting coil and receiving coil can also be interchanged and the same advantages arise therefrom. Fox illustration, only the variant in which all the receiving coils are arranged in one plane and the transmitting coils are arranged orthogonally to one another will now be considered. The use and also the calculation take place similarly when all the transmitting coils are arranged in one plane and the receiving coils are arranged orthogonally thereto.

Figure 5:
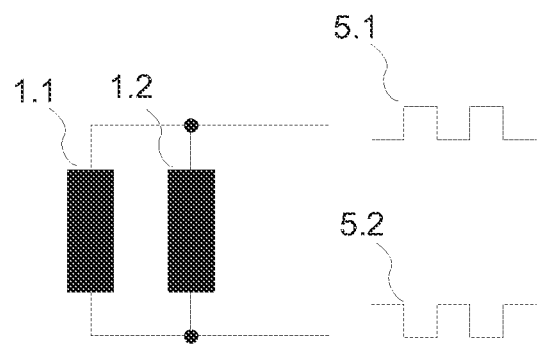
FIG. 5 shows a parallel driving of the transmitting coils with the transmitting signals.

The coil arrangement can be driven or controlled as follows in order to achieve said advantages:

The first and second transmitting coils are driven with an AC signal 5.1, 5.2 in accordance with FIG. 5 so that the electromagnetic fields emitted by the transmitting coils 1.1, 1.2 during a half period of the periodic alternating voltage transmitting signal 5.1, 5.2 are both directed in the direction of the first receiving coil 2.1, and during the other half period of the periodic alternating voltage transmitting signal are both directed away from the first receiving coil 2.1. Due to the orthogonal arrangement of the transmitting coils 1.1, 1.2, the transmitting signals are also arranged orthogonally to one another and extend in the direction of the corresponding axis and thus, in particular, in the direction of the plane of the receiving coil(s) 2.1, 2.2, 2.3, 2.4. The first receiving coil 2.1 can be operated in series with the second receiving coil 2.3. The receiving coils 2.1, 2.3 are thus connected to one another so that a preferably homogeneous electromagnetic field which permeates the structure, generates mutually opposingly directed voltages in the two receiving coils 2.1, 2.3.

A resonance capacitor 3.1 can be connected in parallel with the receiving coil pair 2.1, 2.3. Together with the receiving coils 2.1, 2.3, the resonance capacitor forms a resonant circuit which amplifies and smoothes the induced AC signal.

Voltages induced in the receiving coils are amplified and measured by means of a suitable amplifier circuit. With an ideal geometric arrangement of the coils, the measured signal without the presence of a metallic, conductive object is a "zero signal" without AC components. Tolerances, in particular, manufacturing-related tolerances of the coil arrangement and/or relatively small deviations of the geometrical arrangement of the coils relative to one another can be compensated for with the aid of an alternating voltage compensation signal 6.1 having a defined phase and a defined amplitude, which is fed via a compensation impedance 7.1 to the resonant circuit.

Figure 6:
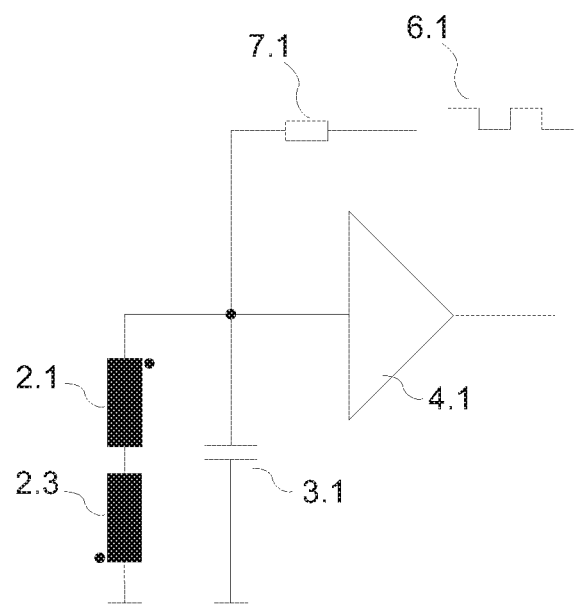
FIG. 6 shows the electronic circuit of the receiving coils.
Figure 7:
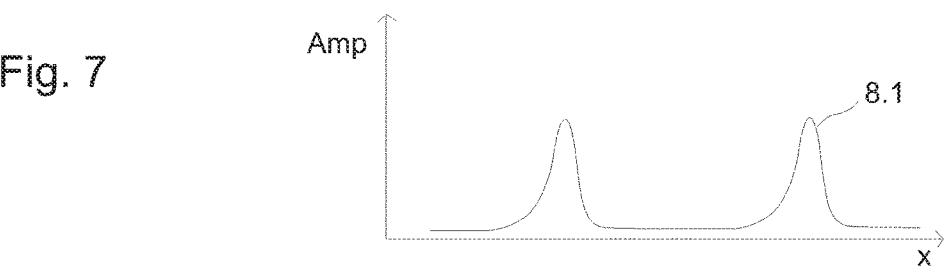
FIG. 7 shows schematically the signal shape occurring on moving over a metallic, electrically conductive grid with a simple coil arrangement.

FIG. 1 shows the plan view, FIG. 2 shows the lateral phantom view of a simple construction of the coil arrangement. FIGS. 5 and 6 show the associated electrical connection of the coils. This arrangement of the components with the connection shown forms a first configuration which enables the detection of grid segments with a one-dimensional movement path x in accordance with FIG. 7. The amplitude response of the first configuration 8.1, which arises along the movement path x of the sensor parallel to a grid structure, is shown in FIG. 7. The signal shows a certain asymmetry, dependent upon the geometry of the coil system.

Figure 8:
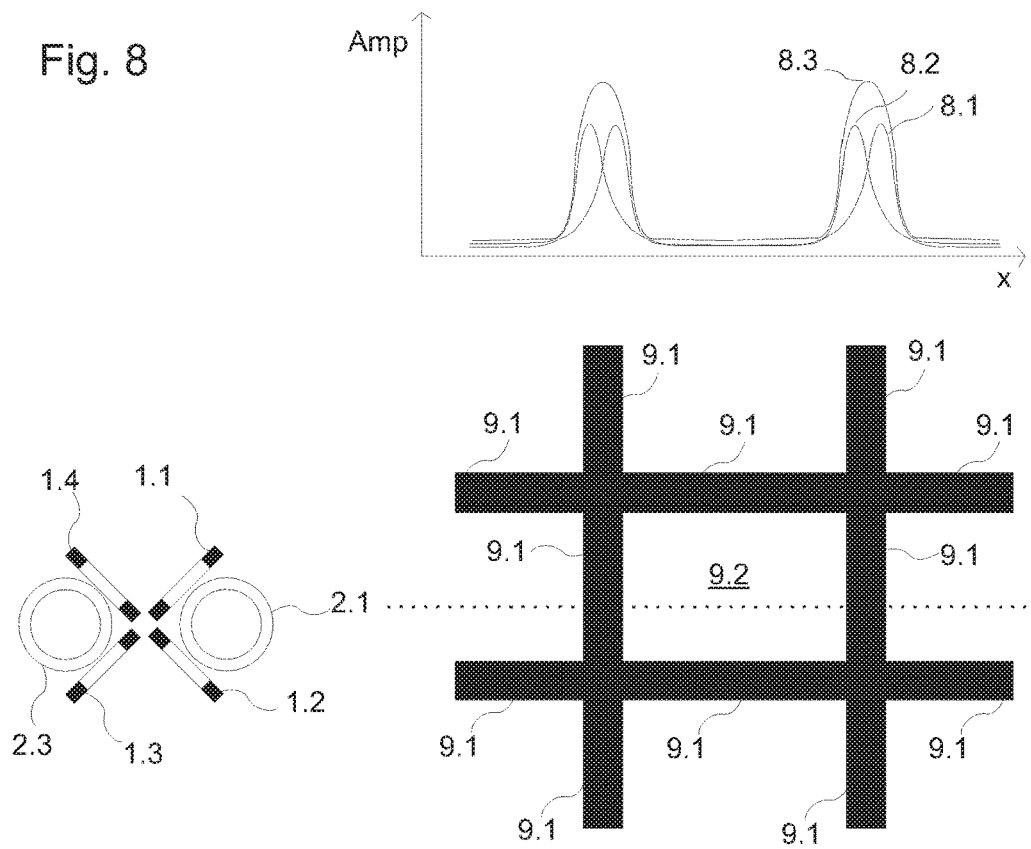
FIG. 8 shows schematically the signal shapes occurring on moving over a metallic, electrically conductive grid with a duplicated coil arrangement for symmetrical one-dimensional measurements.
Figure 9:
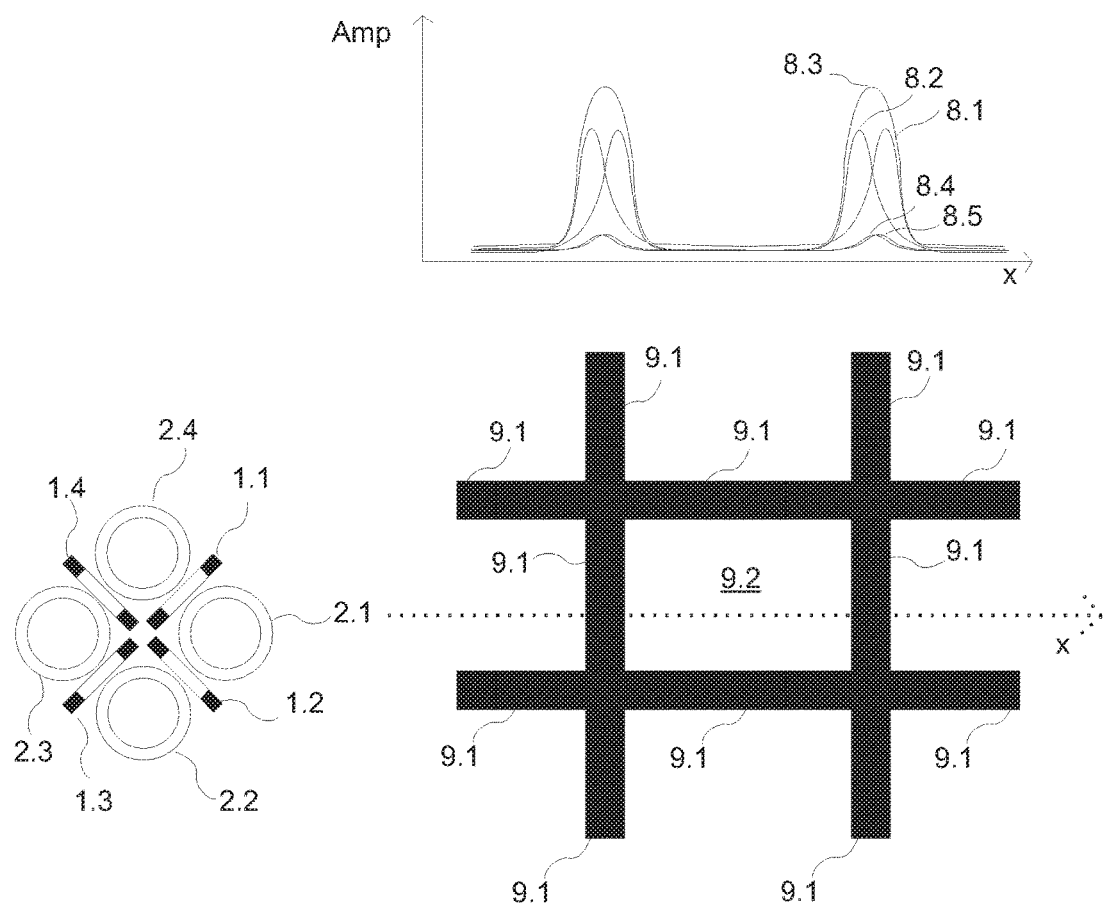
FIG. 9 shows schematically the signal shapes of the four possible configurations occurring on moving over a metallic, electrically conductive grid with a duplicated coil arrangement for symmetrical two-dimensional measurements.

Through the addition of two further transmitting coils 1.3, 1.4, a second configuration in accordance with FIGS. 3, 4 is enabled. In this configuration, in place of the first and second transmitting coils 1.1, 1.2, the third and fourth transmitting coils 1.3, 1.4 are driven with the alternating voltage transmitting signal 5.1. Furthermore, the first and second receiving coils 2.1, 2.3 are used as the receiver. The amplitude responses 8.1, 8.2 of the first and second configurations 8.1, 8.2, which occur along the movement path x of the sensor parallel to a grid structure, are shown in FIG. 8. By addition of the first and second amplitude responses 8.1, 8.2, a symmetrical measurement signal 8.3 arises. By means of time multiplexing of a plurality of configurations, a plurality of measurement signals can be recorded with only one evaluating unit (not shown) of the control circuit.

By means of the addition of a third and fourth receiving coil 2.2, 2.4, two further configurations are enabled. In the third configuration, the second and third transmitting coils 1.2, 1.3, and in a fourth configuration the first and fourth transmitting coils 1.1, 1.4, can serve as the transmitter, whereas the third and fourth receiving coils 2.2, 2.4 can serve as the receiver. FIG. 3 shows a plan view of such a coil arrangement and FIG. 4 shows a lateral phantom view of such a coil arrangement with four transmitting coils 1.1, 1.2, 1.3, 1.4 and four receiving coils 2.1, 2.2, 2.3, 2.4.

For the first configuration, the axes 1.5, 1.6 of the first transmitting coil 1.1 and the second transmitting coil 1.2 are arranged orthogonally to one another and intersect the axis 2.5 of the first receiving coil 2.1, in particular, orthogonally, in particular, ideally in each case orthogonally and at one point, as shown in the exemplary embodiments of FIGS. 1 and 3. As a further receiving coil, the first configuration comprises, for example, the second receiving coil 2.3.

For the second configuration, the axes 1.7 and 1.8 of the third transmitting coil 1.3 and the fourth transmitting coil 1.4 are arranged orthogonally to one another and intersect the axis 2.7 of the second receiving coil 2.3, in particular, orthogonally, in particular, ideally in each case orthogonally and at one point, as shown in the exemplary embodiment of FIG. 3. As a further receiving coil, the second configuration comprises, for example, the first receiving coil 2.1.

For the third configuration, the axes 1.6 and 1.7 of the second transmitting coil 1.2 and the third transmitting coil 1.3 are arranged orthogonally to one another and intersect the axis 2.6 of the third receiving coil 2.2, in particular, orthogonally, in particular, ideally in each case orthogonally and at one point, as shown in the exemplary embodiment of FIG. 3. As a further receiving coil, the second configuration comprises, for example, the fourth receiving coil 2.4.

For the fourth configuration, the axes 1.8 and 1.5 of the fourth transmitting coil 1.4 and the first transmitting coil 1.1 are arranged orthogonally to one another and intersect the axis 2.8 of the fourth receiving coil 2.4, in particular, orthogonally, in particular, ideally in each case orthogonally and at one point, as shown in the exemplary embodiment of FIG. 3. As a further receiving coil, the fourth configuration comprises, for example, the third receiving coil 2.2.

This construction permits the measurement of the grid segments on two-dimensional movement of the sensor parallel to a grid structure.

Figure 10:
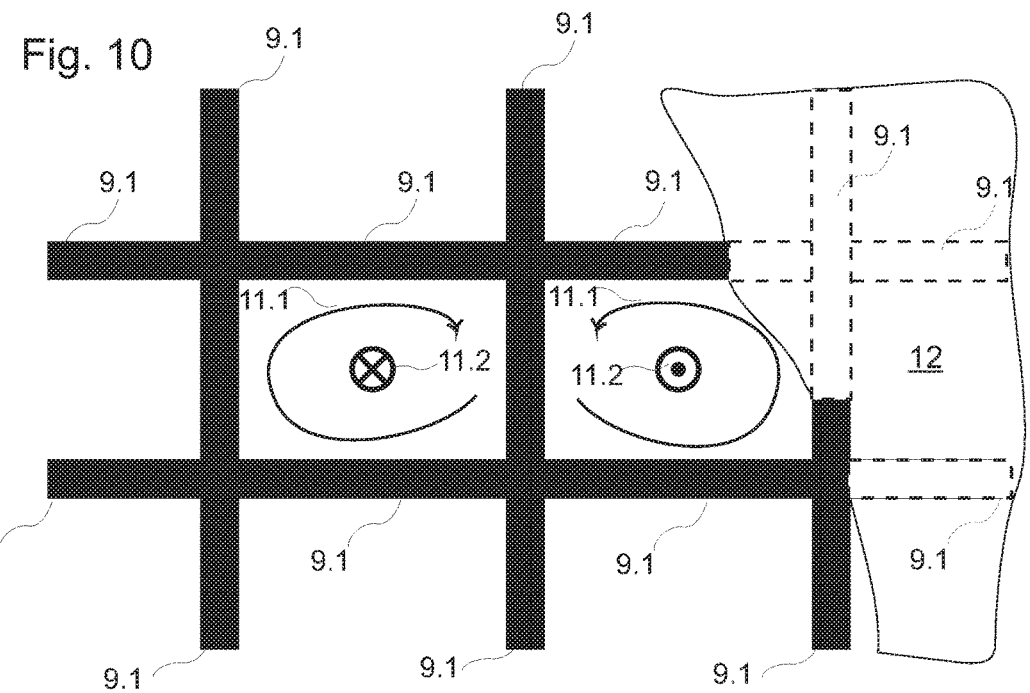
FIG. 10 shows the relationship between the magnetic field direction and the current direction, as they occur in a grid.

FIG. 10 shows a portion of a grid with two closed electrically conducting segments through which electromagnetic fields of opposing directions flow. Due to the different directions of the electromagnetic fields, ring currents with different rotation senses form. In two receiving coils which lie spatially separated in the different electromagnetic fields, voltages of different polarity are induced.

Due to the coupling of the receiving coils shown in FIG. 6, the quantitative sum of the signal amplitudes obtained from two opposing configurations is greatest precisely when the centre point of the coil arrangement is situated exactly under a grid segment 9.1 which separates two closed circuits from one another. If the grid segment has an appreciable areal and/or spatial extent, then "exactly under" can be understood as meaning that the centre point lies centrally under the grid segment 9.1 and/or that the Z-axis of the imaginary Cartesian coordinate system of the coil arrangement intersects the grid segment 9.1 centrally.

It is self-evident that this description can be subject to a wide variety of modifications, amendments and adaptations, which belong within the scope of equivalents to the accompanying claims.

The invention claimed is:

1. Device for detecting an object arranged behind an article that is transparent to an electromagnetic radiation, comprising
   a coil arrangement with a first transmitting coil and a first receiving coil arranged orthogonally to the first transmitting coil,
   wherein the coil arrangement forms a sensor for detecting the object on a relative movement between the device and the article,
   a control circuit for driving at least the first transmitting coil and for evaluating the output signals of the sensor,
   wherein the coil arrangement comprises the first transmitting coil driven as transmitting coil by the control circuit and at least one further transmitting coil driven as transmitting coil by the control circuit and the first receiving coil and at least one further receiving coil,
   wherein an axis of the first transmitting coil and an axis of the at least one further transmitting coil are arranged orthogonally to one another,
   wherein the axis of the first transmitting coil and the axis of the at least one further transmitting coil intersect an axis of the first receiving coil orthogonally,
   wherein the axes of the first transmitting coil and of the at least one further transmitting coil lie in a plane in which the first receiving coil and the at least one further receiving coil are arranged,
   wherein the first transmitting coil and the at least one further transmitting coil are equally spaced apart from the first receiving coil.

2. Device according to claim 1, wherein the axis of the first transmitting coil and the axis of the at least one further transmitting coil intersect an axis of the first receiving coil at one point.

3. Device according to claim 1, wherein the first transmitting coil and the at least one further transmitting coil are transmitting coils, and wherein in a Cartesian coordinate system, an origin of which lies in a middle between the first receiving coil and the at least one further receiving coil and the Z-axis of which points in the direction of the object to be detected, the first receiving coil and the at least one further receiving coil are arranged in the XY plane, whilst at least one of the transmitting coils is arranged in the XZ plane and at least one further of the transmitting coils is arranged in the YZ plane.

4. Device according to claim 1, wherein at least one resonance capacitor is connected in parallel with the first receiving coil and with the at least one further receiving coil and together with the first receiving coil and the at least one further receiving coil forms a resonant circuit.

5. Device according to claim 1, wherein the coil arrangement has a first configuration comprising the first transmitting coil and the at least one further transmitting coil as well as the first receiving coil and the at least one further receiving coil, and has a second configuration comprising at least a third transmitting coil and a fourth transmitting coil as well as the first receiving coil and the at least one further receiving coil, wherein axes of the third transmitting coil and of the fourth transmitting coil and of the first transmitting coil lie in one plane, wherein the control circuit is intended and adapted for adding a first amplitude response of the first configuration to a second amplitude response of the second configuration for a measurement signal, said first amplitude response and said second amplitude response each occurring along a movement path of the sensor on a relative movement between the device and the article.

6. Device according to claim 5, wherein the coil arrangement comprises at least two further receiving coils as a third receiving coil and a fourth receiving coil, and
wherein the coil arrangement has a third configuration comprising the at least one further transmitting coil and the third transmitting coil as well as the third receiving coil and the fourth receiving coil, and has a fourth configuration comprising the first transmitting coil and the fourth transmitting coil as well as the third receiving coil and the fourth receiving coil, wherein the axes of the first transmitting coil, of the third transmitting coil and of the fourth transmitting coil lie in one plane, wherein the control circuit is intended and adapted for evaluating the movement path two-dimensionally.

7. Method for detecting an object arranged behind an article that is transparent to an electromagnetic radiation, wherein a coil arrangement with a first transmitting coil and a first receiving coil arranged orthogonally to the first transmitting coil is provided and wherein the coil arrangement forms a sensor for detecting the object on a relative movement between the device and the article,
wherein the first transmitting coil is driven with a signal and wherein an output signal of the sensor influenced by this signal is evaluated,
wherein the first transmitting coil and at least one further transmitting coil are arranged orthogonally to one another and wherein the first transmitting coil and the at least one further transmitting coil are equally spaced apart from the first receiving coil and are driven with a periodic alternating voltage signal as transmitting coils,
wherein axes of the first transmitting coil and of the at least one further transmitting coil lie in a plane of the first receiving coil and of at least one further receiving coil as receiving coils,
wherein electromagnetic fields emitted by the transmitting coils as a result of the periodic alternating voltage signal during a first half-period of the periodic alternating voltage transmitting signal, are each directed in the direction of the first receiving coil and during the second half-period of the periodic alternating voltage transmitting signal, are each directed away from the first receiving coil,
wherein the first receiving coil is connected and operated in series with the at least one further receiving coil, and
wherein an electromagnetic field which permeates the coil arrangement, generates mutually opposingly directed voltages in the first receiving coil and in the at least one further receiving coil,
wherein the transmitting coils and the receiving coils are configured and operated in such a way, that
the axis of the first transmitting coil and the axis of the at least one further transmitting coil intersect an axis of the first receiving coil orthogonally,
the axes of the first transmitting coil and of the at least one further transmitting coil lie in a plane in which the first receiving coil and the at least one further receiving coil are arranged.

8. Method according to claim 7, wherein the coil arrangement has a first configuration comprising the first transmitting coil and the at least one further transmitting coil as well as the first receiving coil and the at least one further receiving coil, and has a second configuration comprising at least a third transmitting coil and a fourth transmitting coil as well as the first receiving coil and the at least one further receiving coil, wherein the axes of the first transmitting coil, of the third transmitting coil and of the fourth transmitting coil lie in one plane, and
wherein on relative movement between the device and the article along a movement path of the sensor, a first amplitude response that is detected with the first configuration is added to a second amplitude response that is detected with the second configuration, for a measurement signal.

9. Method according to claim 8, wherein the coil arrangement comprises at least two further receiving coils as a third receiving coil and a fourth receiving coil, and wherein the coil arrangement has a third configuration comprising the at least one further transmitting coil and the third transmitting coil as well as the third receiving coil and the fourth receiving coil, and has a fourth configuration comprising the first transmitting coil and a fourth transmitting coil as well as the third receiving coil and the fourth receiving coil, wherein the axes of the first transmitting coil, of the third transmitting coil and of the fourth transmitting coil lie in one plane, and wherein the first amplitude responses of the first configuration and the second amplitude response of the second configuration are added together for a measurement signal along the movement path and wherein the third amplitude response of the third configuration the fourth amplitude response of the fourth configuration are added together for a measurement signal transverse to the movement path.

10. Method according to claim 9, wherein the at least one further receiving coil and the at least two further receiving coils are further receiving coils, wherein a quantitative sum of the amplitudes obtained from two of the first configuration, the second configuration, the third configuration, and the fourth configuration, which lie opposing one another is greatest precisely when an origin of an imaginary Cartesian coordinate system of the coil arrangement, said origin lying in the middle between the first receiving coil and the further receiving coils, the XY plane of said coordinate system lying in the first receiving coil and the further receiving coils and its Z axis pointing in the direction of a grid segment to be detected, lies exactly centrally over the grid segment which separates two electrically conductive closed circuits of a grid structure from one another.

11. Method according to claim 8 wherein a quantitative sum of the first amplitude response and of the second amplitude response obtained from the first configuration and from the second configuration which lie opposing one another is greatest precisely when an origin of an imaginary Cartesian coordinate system of the coil arrangement, said origin lying in the middle between the first receiving coil and the at least one further receiving coil, the XY plane of said coordinate system lying in the first receiving coil and the at least one further receiving coil and its Z axis pointing in the direction of a grid segment to be detected, lies exactly centrally over the grid segment which separates two electrically conductive closed circuits of a grid structure from one another.

\* \* \* \* \*